July 9, 1929.
G. C. JETT
1,720,553
CREEPER TRUCK FRAMEWORK
Filed Dec. 9, 1926
3 Sheets-Sheet 1
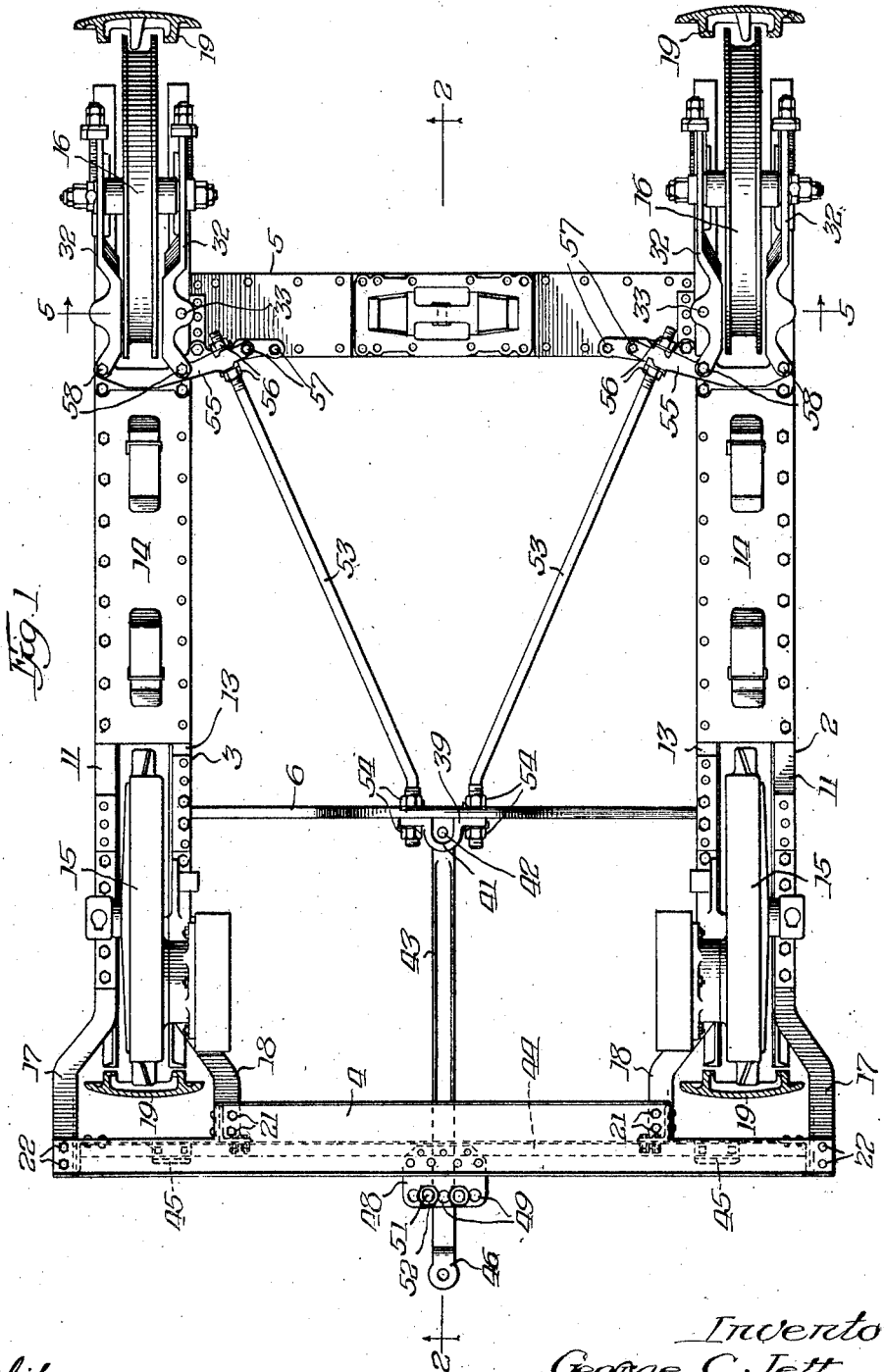

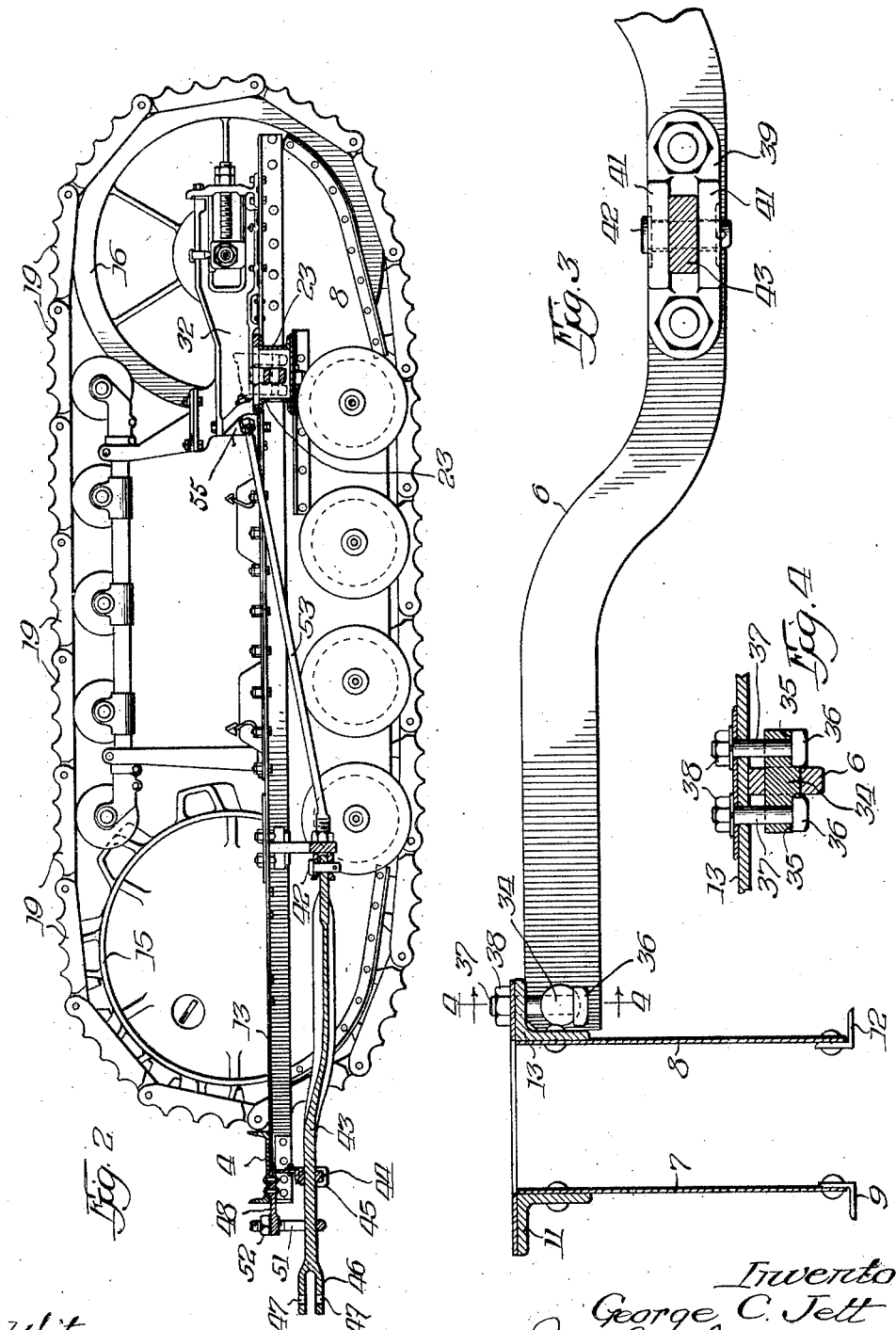

July 9, 1929.                G. C. JETT                 1,720,553
                      CREEPER TRUCK FRAMEWORK
                       Filed Dec. 9, 1926           3 Sheets-Sheet 3
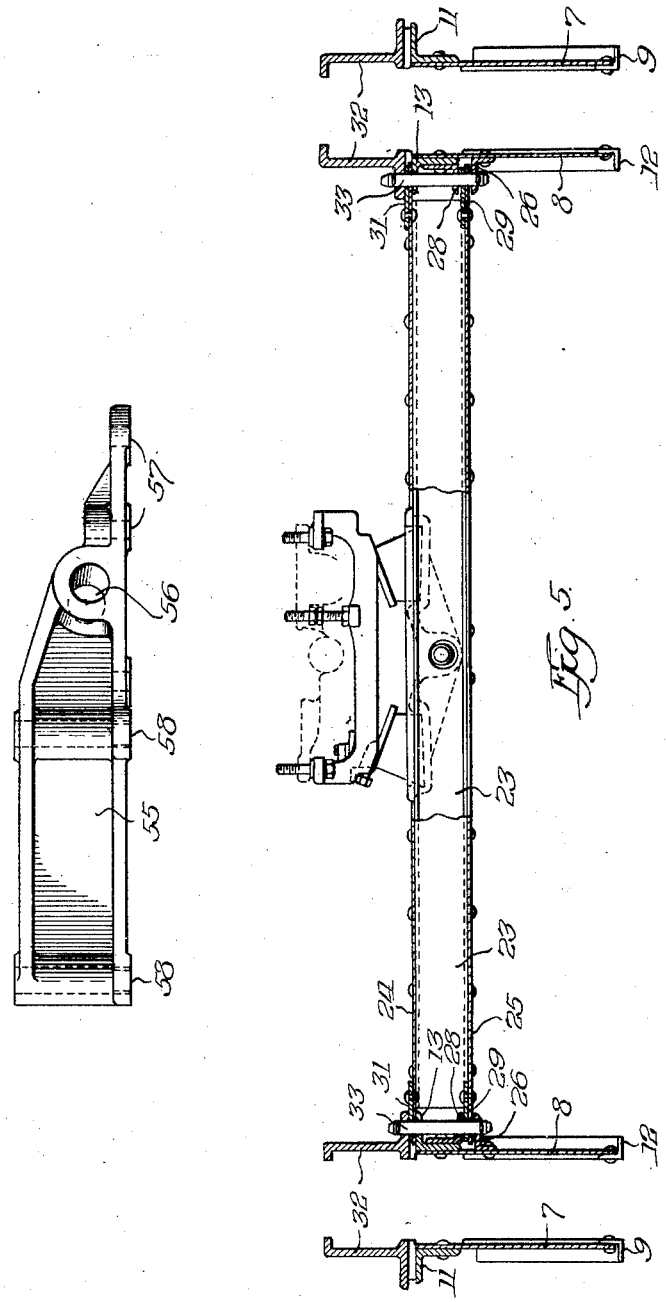
Witness:
Inventor
George C. Jett,
By Ira Wilson
Atty Patented July 9, 1929.

1,720,553

UNITED STATES PATENT OFFICE.

GEORGE C. JETT, OF MILWAUKEE, WISCONSIN, ASSIGNOR OF TWO-FIFTHS TO WALTER H. STIEMKE, OF MILWAUKEE, WISCONSIN.

CREEPER-TRUCK FRAMEWORK.

Application filed December 9, 1926. Serial No. 153,539.

This invention relates to vehicle construction and more particularly to the framework and structural elements of a tractor, being quite particularly suitable for and useful in a tractor of the creeper type having a final drive reduction gearing, such as that disclosed in my copending application for driving sprocket mount, Serial No. 153,540, filed of even date.

Tractor truck framework for tractors of the creeper type and particularly for those of the type disclosed in the aforesaid copending application must be of great strength and rigidity in all its members and preferably of a unitary construction so that a minimum of relative movement between the various members composing the frame may take place. There must be sufficient strength in the structure to prevent distortion under the innumerable stresses which are placed upon it from almost every direction. As above noted it is absolutely necessary to have the greatest possible rigidity in the frame structure for the use of the invention described and claimed in the above noted copending application.

Not only must tractor truck framework support its own load, that is, its own weight and the weight of its driving machinery, but it must be able to withstand the loads which must be imposed upon its drawbar and those loads which may be superimposed upon it, such as when the tractor supports mechanism thereon; for instance, loaders, shovels, concrete mixers, etc. Accordingly it is one of the primary purposes of this invention to provide a framework for creeper-type tractors which may be built up from separate and separable parts, attached to the driving mechanisms of a round-wheeled tractor or other similar mechanism by removing the wheels or the like thereof, thereby converting the round-wheeled or other tractor into a creeper-type tractor and at the same time provide a strong and rigid supporting framework for its purpose.

Another object is to provnde a tractor framework substantially universal in its character and one which may be easily adapted to various machines, such as diggers, cranes, hoists, loaders, concrete mixers, etc., as well as for strictly tractor purposes.

The conversion of a round wheel tractor into one of the creeper-type increases the drawbar pull and therefore the stresses imposed throughout the tractor. Accordingly, a further object is to provide a novel drawbar construction, whereby the loads and stresses imposed on the drawbar by a drawn load will be induced directly upon the creeper trucks where they properly belong and not into or through the tractor proper, that is, the tractor power plant unit, which has been designed primarily for a lighter load. In this connection suitable anchor means for the drawbar and its carrying member are provided and serve not only for this function but also to brace various frame members against other stresses which may be imposed upon them, and finally to place the drawbar load on the creeper truck frame members.

A still further object is to provide a dual drawbar arrangement, that is, a stationary drawbar or drawhead and a swinging drawbar or drawhead which may be utilized severally or jointly and means for locking the swinging drawbar against oscillation or swinging movement whenever it may be desirable so to do.

Still further objects include the provision of novel means for securing the transverse and longitudinal frame members securely and rigidly together in such manner that they may be readily and easily disassembled or taken apart and reassembled by unskilled labor, the provision of novel anchor members and the provision of many further novel features of construction and arrangement which will be or should become readily appreciable after reading the following description and claims and after viewing the drawings in which:

Fig. 1 is a top plan view of a creeper-type tractor truck or frame mechanism.

Fig. 2 is a longitudinal substantially central section in elevation taken on the line 2—2 of Fig. 1.

Fig. 3 is a front elevational view partially in section of a part of the intermediate axle or transverse frame member to which the swinging drawbar is pivotally connected, showing its means of connection to the longitudinal or side frame members.

Fig. 4 is a sectional view taken on the line 4—4 of Fig. 3.

Fig. 5 is a sectional view of the front girder or transverse frame member taken on the line 5—5 of Fig. 1, and Fig. 6 is an elevational detail view of an anchor bracket.

The truck framework in the embodiment of the invention illustrated comprises longitudinal members generally designated 2 and 3, which are substantially identical with one another except that one is a right hand frame and the other a left, a rear end or transverse frame member 4, a front transverse frame member 5, and an intermediate transverse frame member 6. The members 2, 3 and 5 may, herein, be termed box frame members to distinguish them from unitary integral frame elements such as that designated 6. Each side frame member is composed of vertically spaced plates 7 and 8 which are suitably braced along portions of their upper and lower peripheries by angle irons 9, 11, 12 and 13 and connected together for a portion of their length by a plate 14. Each plate 14 terminates intermediate the ends of the vertical plates 7 and 8 to provide recesses within which the driving wheels or sprockets 15 and the driven wheels or sprockets 16 are positioned. The top angle irons 11 and 13 are each extended rearwardly and outwardly of the tractor frame beyond the planes of the plates 7 and 8, as shown at 17 and 18 respectively, in order to clear the tread links 19 of the chain tread of the tractor and to provide a support and connection for the rear transverse girder or member 4 which is preferably bolted thereto by bolts 21 and 22 so that it may easily be removed. The wheels or sprockets 15 and 16 are, of course, suitably mounted in bearing brackets on the longitudinal frame members.

The front girder 5, shown more particularly in Fig. 5, is composed of side channels 23 which terminate short of the interior side frame plates 8 and top and bottom plates 24 and 25 respectively, which are riveted or otherwise secured to the channels 23 and extend beyond the ends of the latter for support upon angles 26 and 13 riveted or otherwise secured to the plates 8. Above and spaced from each angle 26 is an angle 28 to provide a recess or channel within which the ends of the bottom plates 25 of the front girder are received together with reinforcing plates 29 riveted thereto. The fit between the plates 25 and 29 and the opposed faces of the angles 26 and 28 should be reasonably snug. The ends of the top plate 24 are reinforced by plates 31 and are received between the top face of each angle 13 and the bottom face of one of a pair of bracket members 32, which are supported on and secured to the longitudinal frame members 2 and 3 for supporting the journals or bearings of the driven or idling sprockets 16. The fit between the reinforced ends of the top plate 24 and the side frame members should also be snug. The front box girder is secured to the side frame members in rigid relation thereto by a single pin 33 at each end. This pin is made of specially hardened steel of ample proportions for double shear on each end and passes, with a close fit, through aligned openings in the angle 26, the plates 25 and 29, the angle 28, the angle 13, the plates 24 and 31, and the inside bracket 32, at each side. The pins 33 are suitably cottered in place after the front girder has been assembled to the side frame members.

The intermediate transverse member 6 is secured to the longitudinal frame members in a manner more particularly illustrated in Figs. 3 and 4, from which it will be noted that it is drilled adjacent each end for the reception of a pin 34, the ends of which on one side are flattened as at 35 for engagement by the heads 36 of bolts 37 which pass through holes formed in the ends of the pins and the top flange of the angle 13 where they are secured by nuts 38. The central portion of the transverse member 6 is provided with a strap 39 having hinge lugs 41 which are drilled to receive a hinge pin 42 which pivotally secures the end of a drawbar or swinging drawhead 43 thereto. A guide and supporting bar 44 for the drawbar 43 is supported transversely of the frame in brackets 45 which are secured in any suitable manner to the transverse frame member or channel 4, as will be clearly seen from Figs. 1 and 2. In this manner the drawbar is supported in its swinging movement from right to left or vice versa to the rear of the tractor frame.

The swinging drawbar or drawhead 43 is provided with a forked end 46 and with registering openings 47 for a coupling pin or the like so that a load may be coupled thereto. Under some conditions the swinging drawbar may become useless or even dangerous, such as when a down hill run is encountered that would require the tractor to hold back the load. In this case it may be desirable to dispense with the use of the swinging drawhead or to prevent it from swinging. Accordingly, I provide a stationary drawhead member 48 which is riveted or otherwise suitably secured to the transverse channel or frame member 4 and drill a series of holes 49 therethrough for disposition of a coupling pin on or off center with respect to the center of the tractor. I also provide means for locking the swinging drawbar or drawhead 43 against swinging movement and this means consists of a U-bolt 51 adapted to embrace the drawbar 43 and be secured through the holes 49 to the stationary drawhead 48 by means of nuts 52.

In order to provide strong and substantial anchorage for the drawbar at the transverse member 6 and in order to prevent the transverse member from distorting and buckling under loads imposed on the drawbar, a pair of rods or the like 53, each bolted at one end as shown at 54 to and through the transverse member 6 and bracket 39, extend diagonally rearward and upward to points adjacent the connection of the transverse front girder 5 to the frame members 2 and 3 where they are bolted or otherwise secured in brackets 55, as shown at 56. The brackets 56 are in turn secured, as at 57 and 58, to the transverse frame member 5 and the longitudinal frame members 2 and 3 respectively. In this manner a strong anchorage at the juncture of the front girder to the side frame members of the creeper tractor frame, sufficient to withstand torsional and drawbar stresses, is provided and the connection may readily be made in the field, since for shipping economy the side and transverse frame members are dismantled and disconnected.

Although the transverse frame members 4, 5 and 6 may be disconnected from the longitudinal side frame members 2 and 3 and the drawbar and its anchor means from their connecting parts for economy of shipment, it will at once be apparent that the tractor frame may be quickly and simply assembled and when so assembled will be rigid and strong in all its parts and sufficiently so to withstand stresses which may be imposed upon it under working conditions. I do not, however, desire to be limited to the construction shown and described for the purpose of properly illustrating my invention, since many modifications and variations may be made therein bearing little or no resemblance to the structure illustrated, but only by the spirit of the invention and the scope of the appended claim.

I claim:

A tractor frame construction comprising, side frame members each having a substantially vertical wall, a box section girder for connecting said side frame members, said girder being adapted to engage said members at its ends and said frame members and girder having registerable openings, and a single pin adapted to pass through said openings when in register for connecting each end of said girder rigidly to its adjacent side frame member and against relative movements.

In witness of the foregoing I affix my signature.

GEORGE C. JETT.